United States Patent [19] [11] 3,998,321
Schultz [45] Dec. 21, 1976

[54] CONVEYOR WASH DEVICE

[76] Inventor: Edward D. Schultz, 2306 Cherry Ridge Lane, Brandon, Fla. 33511

[22] Filed: Sept. 15, 1975

[21] Appl. No.: 613,485

[52] U.S. Cl. .............................. 198/495; 134/104
[51] Int. Cl.² .................................... B65G 45/00
[58] Field of Search .............. 198/229, 230, 231; 134/104, 109, 131; 210/523, 526, 400; 74/230

[56] References Cited
UNITED STATES PATENTS

| 616,831 | 12/1898 | Elliott | 210/526 X |
| 2,619,218 | 11/1952 | Krehbiel et al. | 198/231 X |
| 3,420,638 | 1/1969 | Cutter et al. | 134/131 X |
| 3,860,019 | 1/1975 | Teague | 134/109 |

FOREIGN PATENTS OR APPLICATIONS 1,066,948   10/1959   Germany ........................... 198/230

Primary Examiner—John J. Love
Assistant Examiner—Douglas D. Watts
Attorney, Agent, or Firm—Arthur W. Fisher, III

[57] ABSTRACT

A conveyor wash device for use with a conveyor transport system including a conveyor means for transporting particulate material to recover excess particulate material adhering to the return side of the conveyor means. The conveyor wash device comprises a fluid wash basin configured to retain fluid therein to remove the particulate material from the conveyor means, a plurality of conveyor wash rollers disposed to route the return side of the conveyor means through the fluid wash basin and a particulate recovery means configured to transport particulate material from the fluid wash basin to the feed side of the conveyor transport system.

16 Claims, 4 Drawing Figures

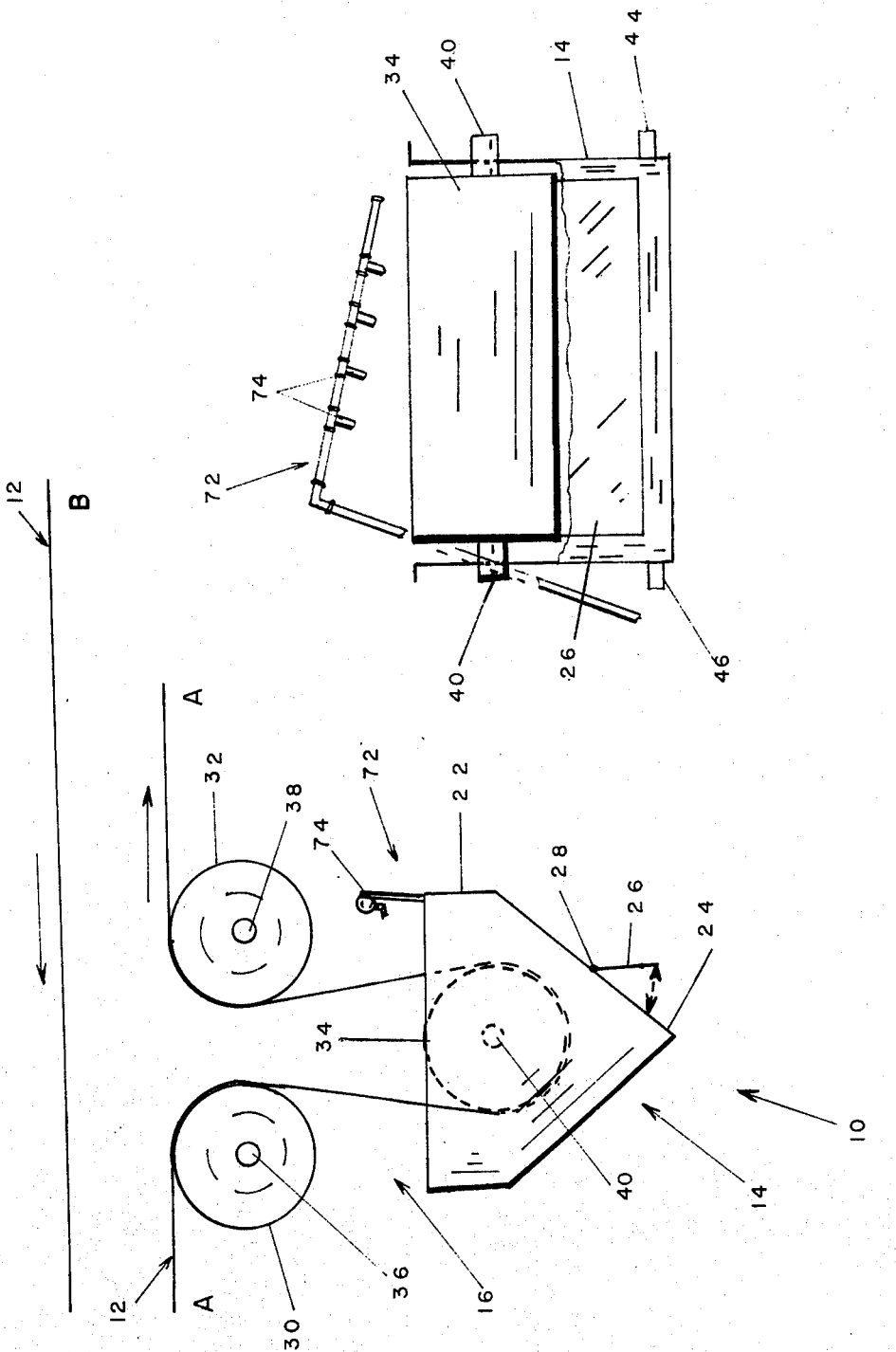

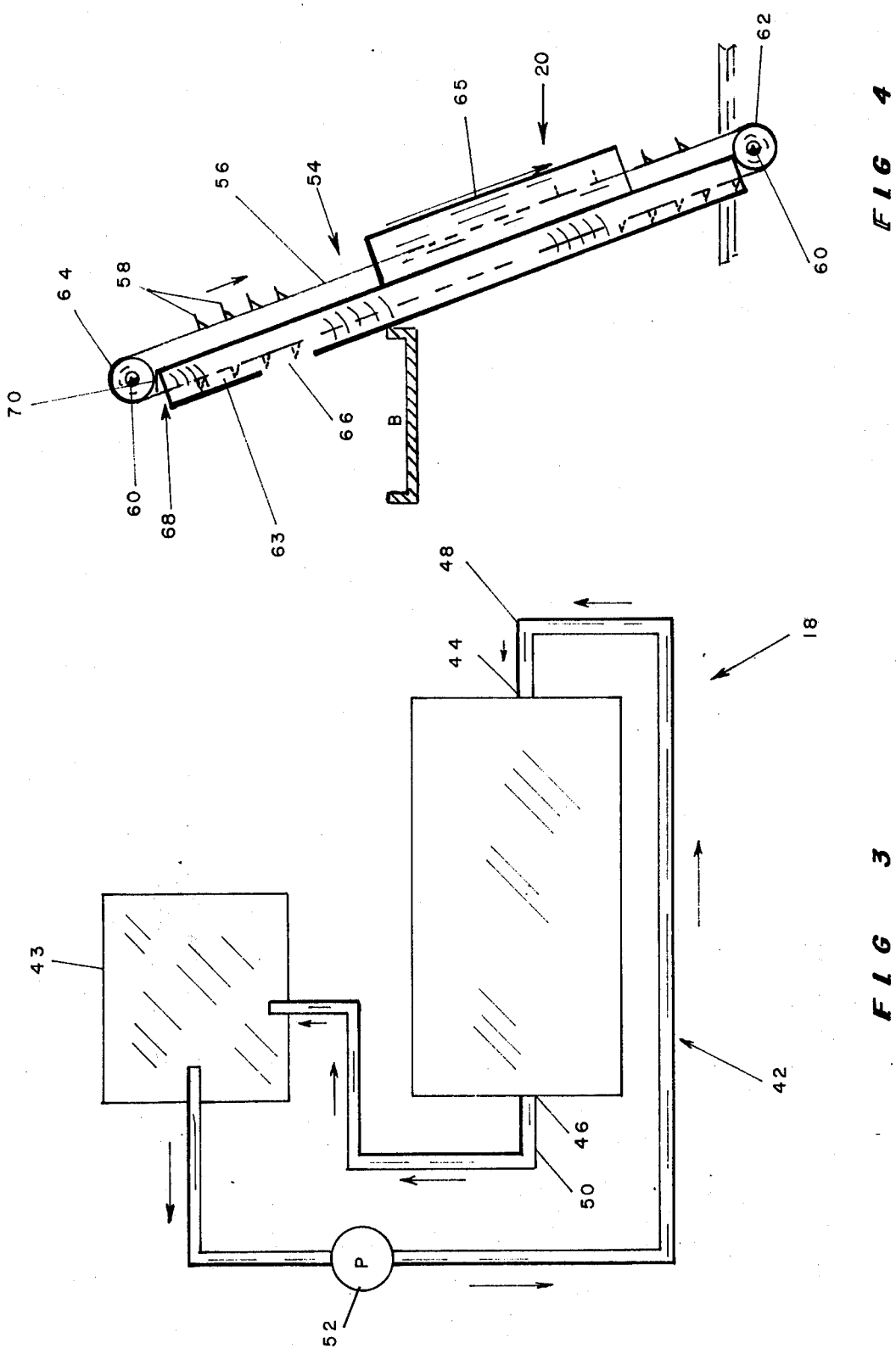

CONVEYOR WASH DEVICE

BACKGROUND OF THE INVENTION

1. Field of the Invention

A conveyor wash device for use with a conveyor transport system to recover excess particulate material adhering to the return side of the conveyor means.

2. Description of the Prior Art

A large number of devices of various construction for stacking and reclaiming bulk material in piles is well known. Often such devices include separate loading or stacking apparatus and reclaiming or scrapping structures. Commonly, such devices feature a conveyor feed means for carrying the particulate material to and from the storage zone and a rake-like reclaiming structure operatively coupled to a boom for reclaiming the stored particulate material. Moreover, a conveyor feed means or conveyor transport means is generally employed to move the particulate material from the storage zone to a loading area.

Particularly, when moving moist or wet particulate material, the particulate material adhere to the return side of the conveyor transport means between the storage and loading zones. As a result, a large amount of particulate material accumulates beneath the return side of the conveyor element. This is not only a waste of the particulate material itself, but requires manpower and operating expenses to remove the particulate material as it accumulates.

Thus, there is a need for a device for accumulating and recovering the excess particulate material; otherwise, lost beneath the conveyor element.

SUMMARY OF THE INVENTION

The present invention relates to a conveyor wash system for use with a conveyor transport system for transporting particulate material to recover surplus particulate material. The conveyor transport system includes a conveyor belt or similar conveyor means for moving the particulate material from a storage zone to a loading zone. Particularly, when handling moist or wet particulate material adheres to the return side of the conveyor means creating a loss of such material. Specifically, the conveyor wash system comprises a fluid wash basin configured to retain fluid therein to remove the particulate material from the return side of the conveyor transport means, a plurality of conveyor wash rollers disposed to route the return side of the conveyor belt through the wash basin and a particulate recovery means configured to transport particulate material from the fluid wash basin to the feed side of the conveyor transport system.

The fluid wash basin comprises an enclosure to retain a supply of water or other suitable fluid to remove the particulate material adhering to the conveyor belt on the return side as more fully described hereinafter. The fluid wash basin further includes an access door pivotally attached to the lower portion thereof to permit access to the interior of the enclosure for periodic cleaning.

The plurality of conveyor wash rollers comprises a set of three substantially cylindrical rollers including first and second upper roller and lower intermediate roller. The first and second upper rollers are disposed above the enclosure having their central axis in substantially the same horizontal plane. The intermediate roller is disposed within the enclosure and at least partially submerged in the fluid contained therein. The central axis of each roller is substantially parallel to the other two rollers. The central axis of the intermediate is disposed between the vertical planes of the central axis of the upper rollers. Further, the vertical tangents of the circumference of the second upper roller and the intermediate roller overlap such that the conveyor belt is inclined inwardly as it travels upwardly between the lower intermediate roller and second upper roller.

The particulate recovery means comprises a particulate withdrawal means and particulate transport means. The particulate withdrawal means includes a particulate flushing means and particulate accumulator reservoir to remove the particulate material from the enclosure to the particulate transport means which carries the particulate material from the particulate accumulator reservoir to the feed portion of the conveyor system to complete the recovery of the particulate material.

In operation, the conveyor transport system including the conveyor means generally moves the bulk particulate material from the point of origin to a point of loading or storage on the feed side thereof. The conveyor means such as a conveyor belt is continuously run having both a feed side and a return side. As previously discussed, when moving wet or moist particulate material, some particulate material adheres to the surface of the conveyor belt or conveyor means on the return side. Thus, to prevent random deposits of the particulate material beneath the conveyor belt as it becomes detached therefrom, the conveyor belt is routed through the conveyor washer device upon its initial stages of the return side. Specifically, the conveyor belt is fed over the first upper roller down beneath the intermediate roller to be submerged in the fluid contained within the basin and up over the second upper roller. The resulting washing action and the particular position of the second roller means relative to the intermediate roller causes the particulate material adhering to the conveyor belt to become detached therefrom and fall into the fluid wash basin where the particulate material is accumulated in the lower portion thereof. As the particulate material accumulates in the lower portion of the fluid wash basin, the particulate flushing means forces the particulate material from the wash basin through a conduit to the particulate accumulator reservoir where the particulate transport means returns the recovered particulate material to the feed side of the conveyor transport system to be transported with the primary source of particulate material from the origin. In this manner, loss of particulate material adhering to the return side of the conveyor belt or conveyor means is reduced to a minimum.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which:

FIG. 1 shows a schematic side view of the conveyor wash device.

FIG. 2 shows an end view of the conveyor wash device along line 2—2 of FIG. 1.

FIG. 3 shows a top view of the conveyor wash device.

FIG. 4 shows a side view of the particulate transport means.

Similar reference characters refer to similar parts throughout the several views of the drawings.

DETAILED DESCRIPTION OF THE PREFERRED EMBODIMENT

As shown in FIGS. 1 through 3, the subject invention comprises a conveyor wash system generally as indicated as 10 for use with a conveyor transport system including a conveyor means such as a continuous conveyor belt shown as 12. The conveyor wash system 10 is specifically configured to recover excess particulate material adhering to the return side A of the conveyor means 12 to avoid loss thereof as it becomes detached from the conveyor means 12 on the return side A of the conveyor transport system (not shown).

As more fully described hereinafter, the conveyor wash system 10 comprises a fluid wash basin 14 configured to retain fluid therein to remove the particulate material from the conveyor means 12, a plurality of conveyor wash rollers generally indicated as 16 disposed to route the return side A of the conveyor means 12 through the fluid wash basin 14 and a particulate recovery means including a particulate withdrawal means indicated as 18 and a particulate transport means generally indicated as 20.

The fluid wash basin 14 comprises an enclosure containing a supply of water or other suitable fluid to remove the particulate material adhering to the conveyor belt 12 on the return side A as more particularly described hereinafter. The enclosure comprises an upper portion generally indicated as 22 and a lower portion generally indicated as 24. The upper portion 22 comprises substantially rectangularly shaped portion while the lower portion 24 comprises a substantially triangularly shaped cross-section to reduce the lower portion thereof to permit effective operation of the particulate withdrawal means 18 as described more fully hereinafter. The fluid wash basin 14 further includes an access door 26 attached or hinged at 28 to the lower portion 24 of the fluid wash basin 14 to permit access to the interior thereof for periodic cleaning.

The plurality of conveyor wash rollers 16 comprises a set of three substantially cylindrical rollers including a first and second upper roller 30 and 32 respectively, and a lower intermediate roller 34. The first and second upper roller 30 and 32 are disposed above the enclosure 14 having central axes 36 and 38 respectively located in substantially the same horizontal plane. The lower intermediate roller 34 is disposed within the upper portion 22 of the enclosure 14 and is at least partially submerged in the fluid contained therein. The central axis 40 of the lower intermediate roller 34 is disposed between the vertical planes of the central axes 36 and 38 respectively of the two upper rollers 30 and 32 respectively. Further, the vertical tangents of the circumference of the second upper roller 32 and the intermediate lower rollers 34 overlap. This particular structure enhances the effectiveness of the recovery as more fully described hereinafter. Each of the three rollers 30, 32 and 34 is rotatably mounted on their respective axes 36, 38 and 40 respectively to facilitate rerouting the conveyor means 12 through the conveyor wash system 10.

As best shown in FIG. 3, the particulate withdrawal means 18 includes a particulate flushing means 42 to remove the particulate material from the lower portion 24 of the enclosure 14 and particulate accumulator reservoir 43 and transport same to the particulate transport means 20. Specifically, the particulate flushing means 42 comprises fluid inlet and fluid outlet means 44 and 46 respectively formed on the lower portion 24. The inlet and outlet means 44 and 46 are coupled to inlet and outlet conduit means 48 and 50 respectively. The inlet conduit means 48 is attached to a pump means 52 while the outlet conduit means 50 communicated with the particulate accumulater reservoir 43. In turn, the suction side of the pump 52 communicates with the particulate accumulater reservoir 43 to recycle the fluid through the system 10.

The particulate transport means 20 comprises a conveyor means 54 to remove the particulate material from the accumulator reservoir 43 to return it to the feed side B of the conveyor means 12. More specifically, the conveyor means 54 includes continuous connecting element 56 supporting at least one rake element 58 to transport the accumulated particulate material to the conveyor means 12. The conveyor means 54 is coupled to a drive means 60 including sprockets 62 and 64 to drive the continuous connecting element 56. In addition, the conveyor means 54 includes an enclosed conduit 63 including a shield or guard 65, primary discharge aperture 66 and secondary discharge aperture 68 with deflector plate 70.

An auxillary wash assembly 72 comprising a plurality of nozzles 74 may be added to wash the belt 12 as it passes from the lower intermediate roller 34 to the second upper roller 32.

In operation, the conveyor transport system including the conveyor means 12 generally moves the bulk particulate material from the point of origin to a point of loading or storage on the feed side B thereof. The conveyor means 12 such as a conveyor belt is continuously run having both a feed side B and a return side A. As previously discussed, when moving wet or moist particulate material, some particulate material adheres to the surface of the conveyor belt or conveyor means 12 on the return side A. Thus, to prevent random deposits of the particulate material beneath the conveyor belt 12 as it becomes detached therefrom, the conveyor belt 12 is routed through the conveyor washer device 10 upon its initial stages of the return side A. Specifically, the conveyor belt 12 is fed over the first upper roller 30 down beneath the lower intermediate roller 34 to be submerged in the fluid contained within the fluid wash basin 14, and up over the second upper roller 32. The resulting washing action and the particular position of the second upper roller 32 relative to the lower intermediate roller 34 causes the particulate material adhering to the conveyor belt 12 to become detached therefrom and fall into the fluid wash basin 14 where the particulate material is accumulated in the lower portion 24 thereof. The relative positions of the lower intermediate roller 34 and second upper roller 32 causes fluid to rush downward to enhance the washing action. As the particulate material accumulates in the lower portion 24 of the fluid wash basin 14, the particulate flushing means 42 forces the particulate material from the fluid wash basin 14 through conduit 50 to the particulate accumulator reservoir 43 where the particulate transport means 20 returns the recovered particulate material through the primary and secondary discharge apertures 66 and 68 to the feed side B of the conveyor transport system to be transported with the primary source of particulate material from the origin.

In this manner, loss of particulate material adhering to the return side of the conveyor belt or conveyor means is reduced to a minimum.

The auxillary wash assembly 72 may supplement the privacy wash spraying high pressure fluid on the surface of the conveyor belt 12.

Thus, an inexpensive conveyor wash device for use with a conveyor transport system including a conveyor means for transporting particulate material is provided.

Of course, a plurality of such device 10 may be arranged in series to permit washing in several stages. Moreover, although smooth rollers are shown, wing pulleys or slide logging may be used to agitate the belt to enhancing the separation of the particulate material from the belt.

It will thus be seen that the objects set forth above, a among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A conveyor wash device for use with a conveyor transport system to recover particulate material adhering to the return side of the conveyor means of the conveyor transport system; said conveyor wash device comprising a fluid wash basin configured to retain fluid therein to remove the particulate material from the conveyor means, a plurality of conveyor wash rollers disposed to route the return side of the conveyor means through the fluid of said fluid wash basin and a particulate recovery means disposed in operative communications with said fluid wash basin and the feed side of the conveyor means to transport particulate material from said fluid wash basin to the feed side of the conveyor means.

2. The conveyor wash device of claim 1 wherein said fluid wash basin comprises an enlarged upper portion and a reduced lower portion.

3. The conveyor wash device of claim 1 wherein said fluid wash basin further includes an access door hingedly attached to the lower portion thereof to permit access to the interior thereof for periodic cleaning.

4. The conveyor wash device of claim 1 wherein said plurality of wash rollers comprises a first upper roller disposed above said fluid wash basin and a lower intermediate roller at least partially disposed within said fluid wash basin.

5. The conveyor wash device of claim 4 wherein said plurality of wash rollers further comprises a second upper roller disposed above said fluid wash basin, said first and second upper rollers disposed on opposite sides of said lower intermediate roller.

6. The conveyor wash device of claim 5 wherein the vertical tangent of the circumference of said second upper roller overlaps the vertical tangent of the circumference of said lower intermediate roller to incline the return side of the conveyor means inwardly relative to the rear periphery of said fluid wash basin.

7. The conveyor wash device of claim 1 wherein said particulate recovery means comprises a particulate withdrawal means including a particulate flushing means having a fluid inlet and outlet means formed on the lower portion of said fluid wash basin, said inlet means coupled to a pump means to force particulate material from said fluid wash basin through said outlet means.

8. The conveyor wash device of claim 7 wherein said particulate recovery means further includes a particulate transport means to transport particulate material from said particulate withdrawal means to the feed side of the conveyor transport means.

9. The conveyor wash device of claim 8 wherein said particulate transport means comprises a conveyor means including a continuous connecting element having at least one rake element attached thereto to move the particulate material from the particulate withdrawal means to the feed side of the conveyor transport means.

10. The conveyor wash device of claim 9 wherein said conveyor means further includes a conduit, said rake element disposed within said conduit from said particulate withdrawal means to the feed side of the conveyor transport means.

11. The conveyor wash device of claim 10 wherein said conduit includes a primary discharge aperture to direct particulate material from said conduit to the feed side of the conveyor transport means.

12. The conveyor wash device of claim 11 wherein said conduit further includes a second discharge aperture and deflector plate to direct particulate material from said conduit to the feed side of the conveyor transport means.

13. The conveyor wash device of claim 10 further includes a guard formed on the outer side thereof to collect any particulate material adhering to said rake element subsequent to discharge to the feed side of the conveyor transport means.

14. The conveyor wash device of claim 8 wherein said particulate withdrawal means further includes a accumulator reservoir coupled to said particulate flushing means to receive particulate material therefrom, said particulate transport means disposed in operative communication with said accumulator reservoir to remove particulate material therefrom.

15. The conveyor wash device of claim 1 further including an auxillary wash means including at least one nozzle disposed to spray fluid on the return side of the conveyor means between said second upper roller.

16. The conveyor wash device of claim 1 wherein said fluid wash basin comprises an enlarged upper portion and a reduced lower portion and said fluid wash basin further includes an access door hingedly attached to the lower portion thereof to permit access to the interior thereof for periodic cleaning, said plurality of wash rollers comprises a first upper roller and second upper roller disposed above said fluid wash basin and a lower intermediate roller at least partially disposed within said fluid wash basin; said first and second upper rollers disposed on opposite sides of said lower intermediate roller, the vertical tangent of the circumference of said second upper roller overlaps the vertical tangent of the circumference of said lower intermediate roller to incline the return side of the conveyor means inwardly relative to the rear periphery of said fluid wash basin, wherein said particulate recovery means comprises a particulate withdrawal means including a particulate flushing means having a fluid inlet and outlet means formed on the lower portion of said fluid wash basin, said inlet means coupled to a pump means to force particulate material from said fluid wash basin through said outlet means; said particulate recovery means further including a particulate transport means to transport particulate material from said particulate withdrawal means to the feed side of the conveyor transport means; said particulate transport means comprises a conveyor means including a continuous connecting element having at least one rake element attached thereto to move the particulate material from the particulate withdrawal means to the feed side of the conveyor transport means, said conveyor means further includes a conduit said rake element disposed within said conduit from said particulate withdrawal means to the feed side of the conveyor transport means, said conduit includes a primary discharge aperture to direct particulate material from said conduit to the feed side of the conveyor transport means, said conduit further including a second discharge aperture and deflector plate to direct particulate material from said conduit to the feed side of the conveyor transport means.

* * * * *